United States Patent [19]
Shima et al.

[11] Patent Number: 5,940,962
[45] Date of Patent: *Aug. 24, 1999

[54] WIRE HARNESS BUNDLING METHOD

[75] Inventors: Noriyasu Shima; Nobuyoshi Ohtani; Haruhiro Mutoh, all of Yokkaichi, Japan

[73] Assignee: Sumitomo Wiring Systems, Ltd., Yokkaichi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/208,848

[22] Filed: Mar. 11, 1994

[30] Foreign Application Priority Data

Mar. 18, 1993  [JP]  Japan .................................. 5-059070
Nov. 4, 1993  [JP]  Japan .................................. 5-275596

[51] Int. Cl.[6] .................................................. H02R 43/00
[52] U.S. Cl. ............................. 29/825; 29/755; 29/33 F; 174/70 R; 174/71 R; 174/72 A; 174/105 R; 248/68.1; 248/74.2; 248/74.3; 428/40; 428/57; 428/58
[58] Field of Search ................. 174/72 A, 70 R, 174/71 R, 24, 26 R, 27, 28, 29, 105 R, 113 R, 117, 126.1, 128.1, 135, 115, 117 A; 248/68.1, 74.2, 74.3; 428/40, 57, 58, 354; 29/825, 755, 741, 739, 846, 33 F, 33 M

[56] References Cited

U.S. PATENT DOCUMENTS

| | | | |
|---|---|---|---|
| 4,576,662 | 3/1986 | Lemke | 174/117 F X |
| 4,723,055 | 2/1988 | Bisker | 174/72 A |
| 4,731,500 | 3/1988 | Otsuka . | |
| 4,939,818 | 7/1990 | Hahn | 24/16 R |
| 5,149,915 | 9/1992 | Brunker et al. | 174/36 |
| 5,168,603 | 12/1992 | Reed | 24/442 X |
| 5,215,297 | 6/1993 | Sato et al. | 269/296 |

FOREIGN PATENT DOCUMENTS

| | | | |
|---|---|---|---|
| 1122574 | 8/1989 | Japan . | |
| 1604676 | 12/1981 | United Kingdom | 174/117 A |
| 2109644 | 6/1983 | United Kingdom . | |

*Primary Examiner*—Carl J. Arbes
*Attorney, Agent, or Firm*—Greenblum & Bernstein P.L.C.

[57] ABSTRACT

One or more specific wires is placed at the middle of the wire harness cross section with double-sided adhesive tape between the specific wires and the other wires surrounding these core wires. One side of the double-sided adhesive tape adheres to these core wires while the other side adheres to the other wires surrounding the core wires. The double-sided adhesive tape thus positions and holds both the selected core wires and the surrounding other wires. A single-sided adhesive tape can be also used.

15 Claims, 8 Drawing Sheets

WIRE HARNESS BUNDLING METHOD

BACKGROUND OF THE INVENTION

1. Field of the Invention

The present invention relates to a wire harness comprising plural wire groups for automotive applications, and to a corresponding wire harness bundling method.

2. Description of the Prior Art

Figure 7:
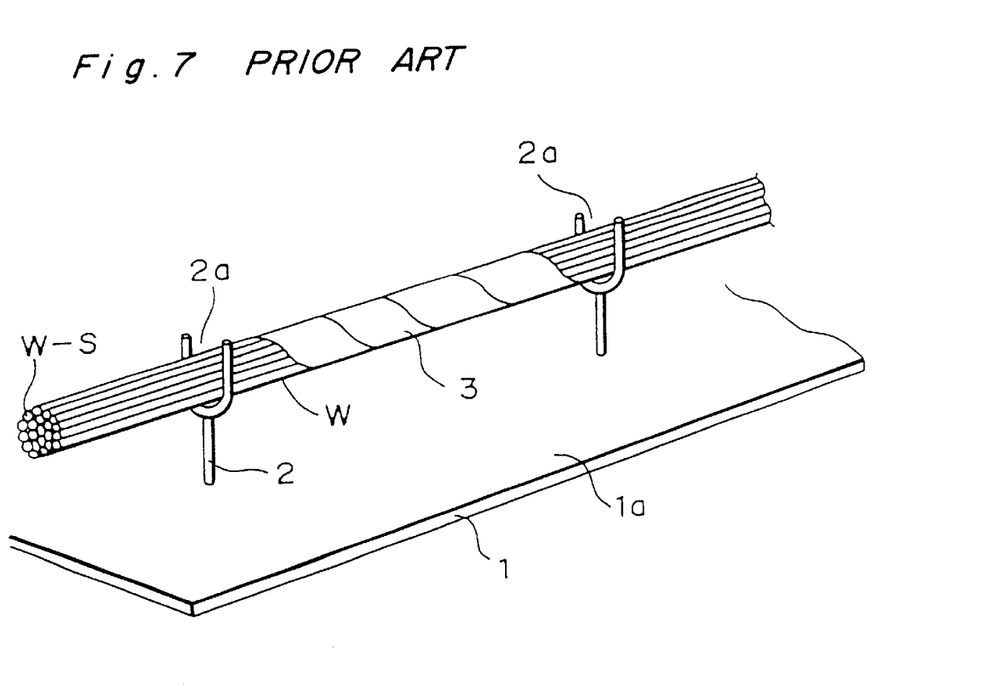
FIG. 7 is a perspective view showing the conventional wire harness bundling method.

As shown in FIG. 7, a conventional automotive wire harness is manufactured using bundling stands 2 placed at predetermined positions in a wire harness assembly stand 1. The specified number of wire strands W are placed in the wire holders 2a of the bundling stands 2, and are then wrapped with tape 3 to form the wire bundle.

In a wire harness of plural wires bundled as described above, it is preferable to place at the cross sectional center of the bundle, specifically not at the outside of the bundle, any wires that must be positively shielded from noise or any wires for which it is essential to prevent any contact, and therefore shorting, with body panels. Examples of such wires include live power supply lines directly connected to the battery, and/or twisted wires for audio speakers.

With the conventional wire harness manufacturing method thus described, however, the plural wires W inserted to the roughly U-shaped wire holders 2a of the bundling stands 2 are inserted at random from the top opening of the wire holders 2a and gathered. There is no specific means available for positioning and holding selected core wires at the cross sectional center of the bundle. Wrapping the bundle with tape 3 while holding the selected core wires at the center of the bundle is time-consuming, and it is not easy to hold specific wires at the center. In addition, the wires that should be positioned at the center of the wire harness are at times actually positioned at the outside of the wire harness.

While it is possible for the worker to wrap the bundle with tape 3 while holding the selected core wires at the center, this is not possible if it is not known which of the many wires are the specific wires to be placed at the bundle center.

In addition, even if the specific wires are identified and centered in the bundle when the wires are wrapped with tape 3, there are usually plural specific wires to be centered in the bundle, and it is not easy to positively hold all of the specific wires in the center while wrapping the bundle.

Figure 8:
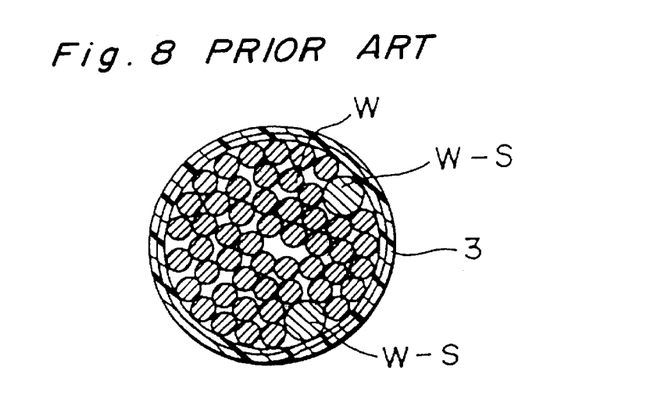
FIG. 8 is a cross-sectional view of a conventional wire harness.

As a result, it is difficult to completely resolve the problem of at least some of the specific wires W-S that should be positioned at the center of the wire harness being at times actually positioned at the outside circumference of the wire harness, as shown in FIG. 8.

Figure 9:
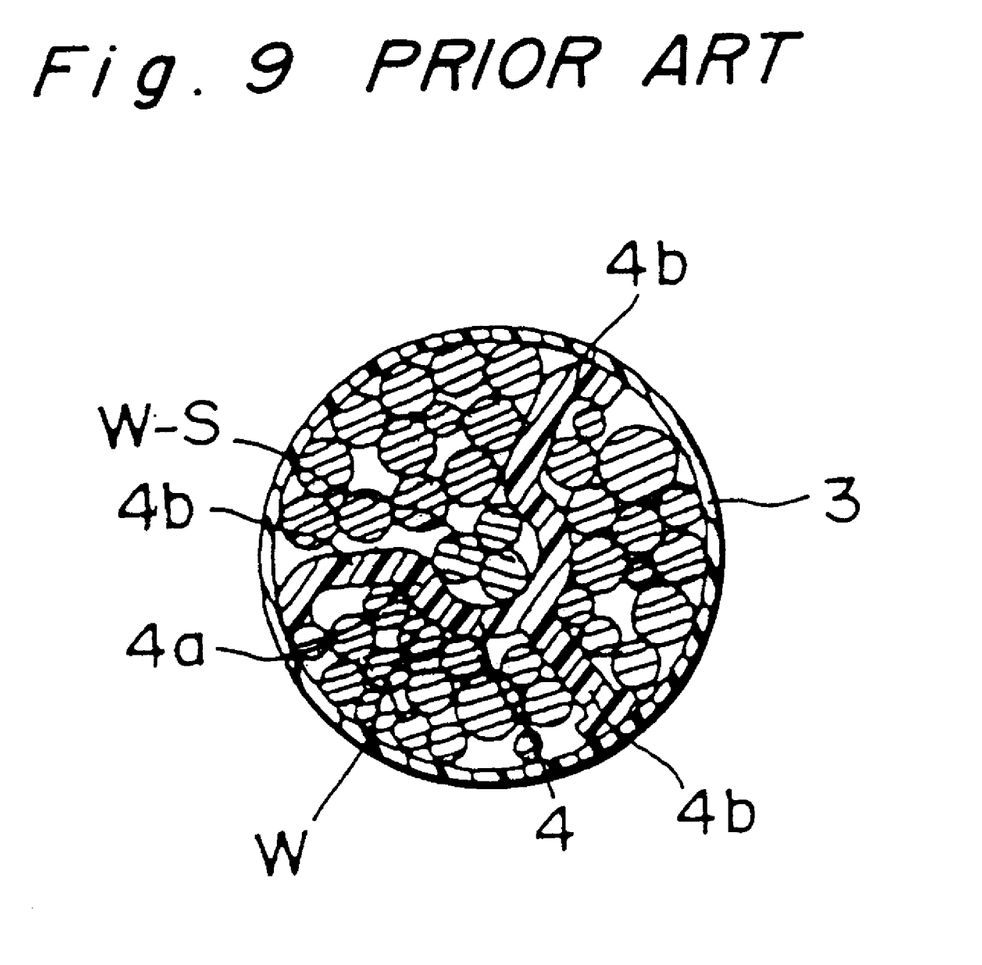
FIG. 9 is a cross-sectional view of a conventional wire harness with a bundling tool.

As shown in FIG. 9, a bundling tool 4 for specifically positioning specific wires has been proposed, such as in Japanese Utility Model Publication (unexamined) No. 1-122574.

This bundling tool 4 comprises three spokes 4b radiating from the outside of a nearly ring-shaped holding member 4a. With this bundling tool 4, the plural specific wires W-S are held in the holding member 4a and secured to the bundling tool 4 with tape, the other wires W are placed around the outside of the holding member 4a holding the specific wires, and the outside of this wire bundle is then wrapped with tape 3 to complete the wire harness.

Because the tape 3 is wrapped around the outside of the plural spokes 4b when this bundling tool 4 is used, the outside diameter of the wire harness must correspond to the outside diameter of the bundling tool 4. As a result, a different bundling tool 4 must be used for each wire harness size (diameter), and cost thus rises.

The opening of the holding member 4a is also large and the holding member 4a opens to the outside. As a result, there will be cases in which all of the specific wires W-S cannot be held at the center of the wire harness because some of the specific wires W-S can easily escape from the holding member 4a, and there is no means of holding the other wires W positioned around the holding member 4a. Wrapping the wire bunch with tape can therefore be a time-consuming and difficult task.

SUMMARY OF THE INVENTION

Therefore, an object of the present invention is to provide a wire harness for positioning and holding specific wires at the cross sectional center of the wire bundle, and to a simple bundling method for said wire harness.

To achieve this object, the present invention provides a wire harness of plural electrical wires bundled together by a binding material such that at least one specific wire is positioned at a cross sectional center of the bundle of wires. The wire harness of the present invention comprises a first binding sheet having opposite surfaces with adhesive characteristics at least on one surface thereof for binding the specific wire, and a second binding sheet for binding the electrical wires with the bound specific wire positioned at a cross sectional center of the bundle of wires so that the outside surface of the first binding sheet is attached to wires other than the specific wire.

According to one preferred embodiment, the wire harness is characterized by inserting a double-sided adhesive tape, butyl tape, or other tape with adhesive areas on both sides thereof between the selected core wires and the other wires positioned around said selected core wires for positioning and holding the selected core wires and the other wires. One side of the tape with double-sided adhesive members adheres to the selected core wires positioned at the wire harness center, and the other side adheres to the wires placed around the selected center wires.

The plural selected core wires are bundled adhering to one side of the double-sided adhesive tape or butyl tape (hereinafter simply "double-sided adhesive tape"), the other wires are placed around the outside of the bundled selected core wires adhering to the other side of the double-sided adhesive tape, and with the selected core wires positioned in the center and the other wires positioned around the outside of the selected core wire bundle, the outside of the wire harness is bound with an electrical insulation adhesive tape, or a colgate tube is fit over the wires to bundle the wire harness.

The present invention further provides a wire harness bundling method whereby wires other than selected core wires are placed in the wire holder of the binding jig projecting from a wire harness assembly stand; the selected core wires wrapped with double-sided adhesive tape or butyl tape are placed in the wire holder of the binding jig on top of the wrapped other wires such that the outside surface of the double-sided adhesive tape or butyl tape is attached to the other wires; the other wires not adhering to the double-sided adhesive tape or butyl tape are moved to the top or sides of the selected core wires not covered by other wires to envelope the selected core wires on all sides and adhere to the outside of the double-sided adhesive tape or butyl tape; and with the other wires positioned and held around the complete circumference of the selected core wires by means of double-sided adhesive tape or butyl tape, a binding material such as adhesive tape or colgate tube is applied to the outside circumference of the group of other wires to bind the wire bundle, which is then removed from the binding jig.

Alternatively, the present invention provides a wire harness bundling method whereby wires other than selected core wires are placed in the wire holder of the binding jig projecting from a wire harness assembly stand; double-sided adhesive tape or butyl tape is applied to the top surface of the wired other wires such that the bottom side of the double-sided adhesive tape or butyl tape adheres to the other wires positioned at the top of the wires in the wire holder; the selected core wires are placed in the wire holder of the binding jig on top of the double-sided adhesive tape or butyl tape for adhesion to the double-sided adhesive tape or butyl tape; the selected core wires are wrapped with double-sided adhesive tape or butyl tape, and other wires are positioned on top of and beside the selected core wires by means of the double-sided adhesive tape or butyl tape; and with the other wires positioned and held around the complete circumference of the selected core wires by means of double-sided adhesive tape or butyl tape, a binding material such as adhesive tape or colgate tube is applied to the outside circumference of the group of other wires to bind the wire bundle, which is then removed from the binding jig.

It is to be noted that after the selected core wires are placed on and attached to the double-sided adhesive tape or butyl tape, double-sided adhesive tape or butyl tape may be placed on top of and adhered to the selected core wires, and the selected core wires thereafter wrapped with these two lengths of double-sided adhesive tape or butyl tape.

Note also that the plural selected core wires to be positioned at the cross sectional center of the wire harness are preferably wrapped together with tape.

With a wire harness thus comprised, the double-sided adhesive tape placed between the selected core wires and the other wires holds the selected core wires in a specific part of the wire harness bundle, thereby positively positioning and holding the live power supply wires, twisted speaker wires, or other selected core wires in the cross sectional center of the wire harness.

When wrapping the wire harness on the assembly stand according to the wire harness bundling method of the invention, the other wires are placed and wired in the wire holder of the binding jig, and the selected core wires, which are pre-wrapped with double-sided adhesive tape, are then placed on and attached to the other wires by the tape, or the other wires are placed and wired in the wire holder of the binding jig, double-sided adhesive tape is applied on top of the other wires, and the selected core wires are then placed on and held by the double-sided adhesive tape. In either case, the selected core wires are then covered by additional other wires or wrapped with double-sided adhesive tape to envelope the selected core wires, thereby positively and simply positioning the selected core wires at the middle of the other wires.

According to another preferred embodiment, a wire harness comprises a sheet to which common wires are fixed. The sheet is wrapped plural times in a coil around specific wires positioned at the wire harness center such that the common wires and sheet form alternating layers around the outside circumference of the specific wires.

The present invention further provides a bundling method for a wire harness containing specific wires whereby said specific wires are aligned and attached along one edge of the top of a sheet of which the top side is coated with adhesive; the edge of the sheet is rolled in a manner covering the specific wires, and the edge of the sheet is attached to said sheet top to envelope the outside of the specific wires with the sheet; the common wires are then arranged in series with no gaps therebetween on the remaining area of the sheet top, and are thus attached to the sheet top; the assembly is then coiled from the edge of the sheet covering the specific wires; and the remaining other end of the sheet adheres to the outside surface of the outermost sheet layer to secure the coil.

This sheet is preferably a pliable sheet material of polyethylene or polyvinyl chloride 0.01–0.07 mm thick. As a result, if a gap develops between the specific wires or common wires, the sheet can enter said gaps to eliminate any gap between the wires.

By means of the bundling method of the invention, the specific wires are arranged along one edge of the sheet and fixed to the top of the sheet. The sheet is then rolled up so that the sheet envelopes the specific wires, and the sheet edge is attached to the sheet on the other side of the specific wires. The common wires are then arranged side by side on the remaining sheet area, and are wrapped in a coil around the specific wires previously bundled in the sheet. The protective sheet is then removed from the adhesive at the other edge of the sheet, and this other edge is attached by adhesive to the outside of the sheet and wire coil.

With a wire harness thus bundled, it is possible to positively and simply position the specific wires at the cross sectional center of the wire bundle, and the layered structure of alternating common wire and sheet layers surrounding the specific core wires functions to provide excellent protection for the specific wires.

Specifically, any external interference must first penetrate plural layers of sheet and common wires before reaching the specific wires, and the common wires will therefore short before the specific wires can short due to this external interference. As a result, problems with the wire harness can be recognized from shorting of the common wires before the specific wires can short.

In addition, the bundling tool is a commonly available sheet coated on one side only with adhesive; no special tools are required, and the invention can be achieved at low cost.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
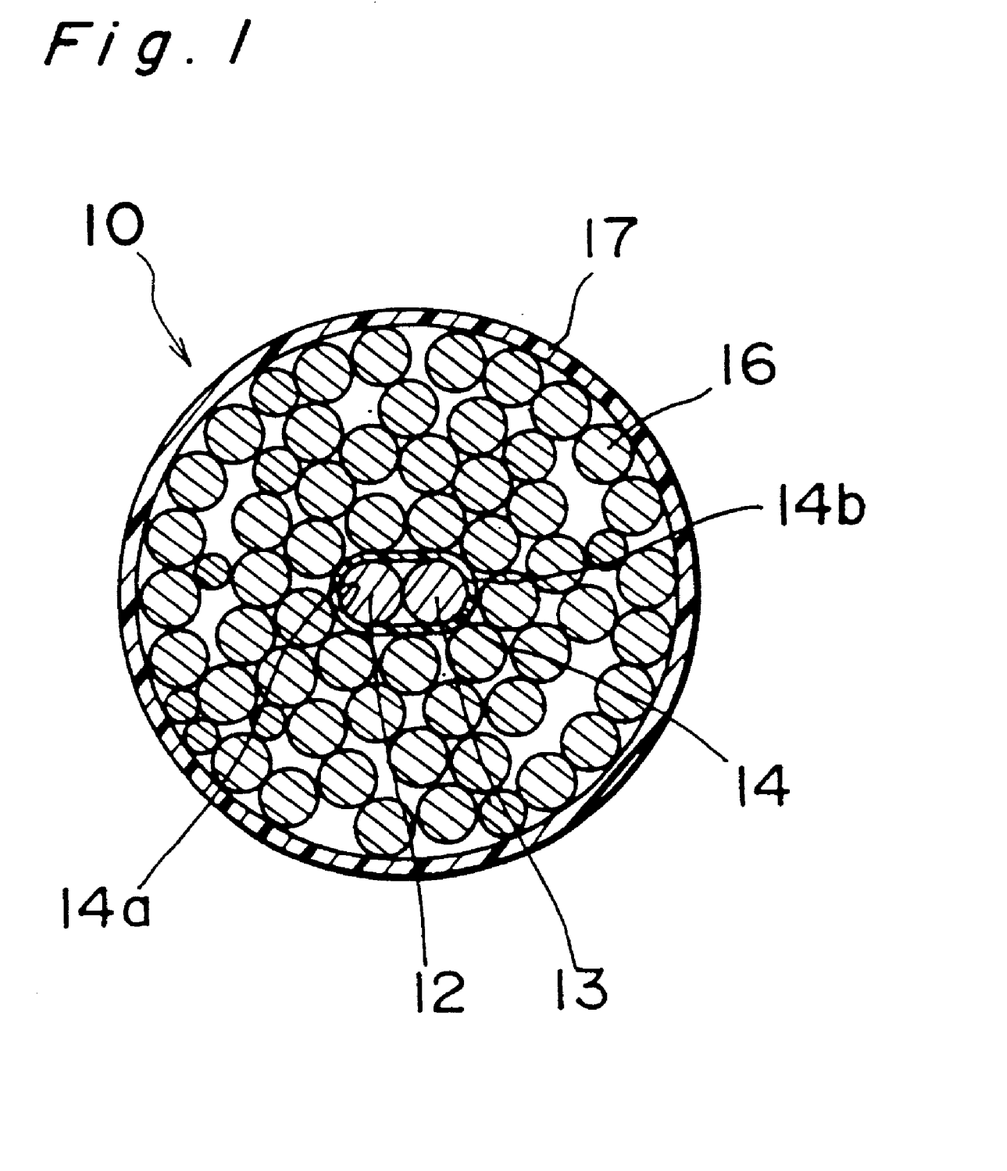
FIG. 1 is a cross-sectional view of a wire harness according to the present invention.

The preferred embodiments of the present invention are described below with reference to the accompanying figures, of which FIG. 1 shows a cross section of a wire harness according to the present invention.

As shown in FIG. 1, two specific wires 12 and 13 are positioned at the cross sectional center of the wire harness 10. A sheet of double-sided adhesive tape 14 is wrapped around the outside circumference of these specific wires 12 and 13 with the specific wires 12 and 13 adhering to the inside surface 14a of the double-sided adhesive tape 14. Other wires 16 are positioned surrounding the specific wires 12 and 13 with some of the other wires 16 adhering to the outside surface 14b of the double-sided adhesive tape 14. Note that only the inside other wires 16 contact the double-sided adhesive tape 14 while the outside other wires 16 do not contact the tape 14.

Adhesive tape 17 is then wrapped around the outside circumference of the outside other wires 16 surrounding the specific wires 12 and 13 to bundle all of the wires together.

Note that the adhesive tape 17 may be applied to the complete length and outside circumference of the other wires 16, or may be provided at just the two ends and at a number of intermediate points as required by the length of the wire harness. The wire bundle may also be sheathed with colgate tube (not shown in the figures) as an alternative to using adhesive tape 17.

The wire harness shown in FIG. 1 is manufactured by means of the process described below. FIGS. 2a–2f show the first bundling method of the invention.

Figure 2A:
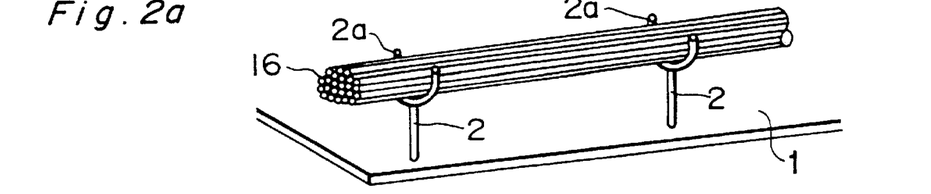
FIGS. 2a–2f are perspective views showing the steps according to the first embodiment for making a wire harness of the present invention.

The first step, as shown in FIG. 2a, is to place all of the wires 16 other than the specific wires 12 and 13 in the U-shaped wire holders 2a of the bundling stands 2, which project from the wire harness assembly stand 1.

Figure 2B:
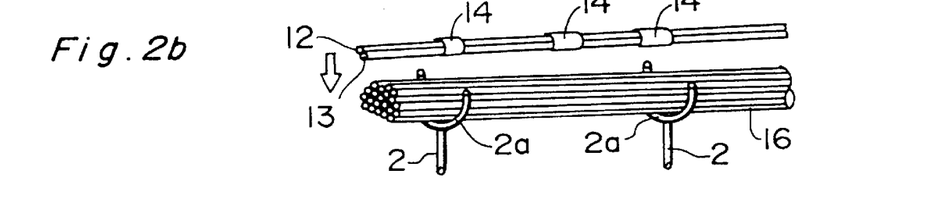

As shown in FIG. 2b, the specific wires 12 and 13 bundled together with double-sided adhesive tape 14 wrapped around the outside thereof are then placed in the wire holders 2a of the bundling stands 2 on top of the other wires 16 in the wire holders 2a.

The double-sided adhesive tape 14 wrapped around the specific wires 12 and 13 may be provided at just the two ends and at a number of intermediate points as required by the length of the wire harness, or along the entire length of the specific wires 12 and 13.

Figure 2C:
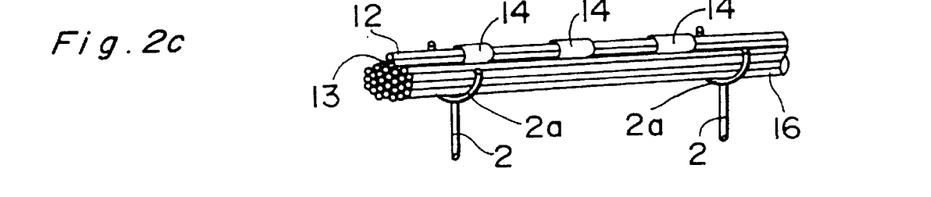

Then, as shown in FIG. 2c, the outside surface 14b of the double-sided adhesive tape 14 wrapped around the specific wires 12 and 13 adheres to plural other wires 16 placed in the wire holders 2a. Note that applying pressure to the double-sided adhesive tape 14 will assure positive adhesion to the other wires 16.

Figure 2D:
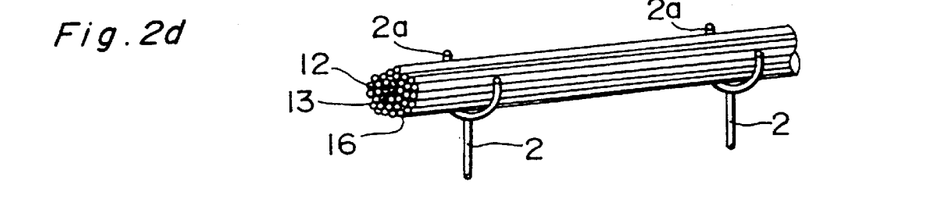

As shown in FIG. 2d, other wires 16 below the specific wires 12 and 13 and not adhering to the double-sided adhesive tape 14 are moved to the top side of the double-sided adhesive tape 14 such that the entire outside surface 14b of the double-sided adhesive tape 14 adheres to other wires 16. As a result, the specific wires 12 and 13 are enveloped by the other wires 16 and held in position by the double-sided adhesive tape 14, i.e., the specific wires 12 and 13 are now positioned at the cross sectional center of the wire group.

Figure 2E:
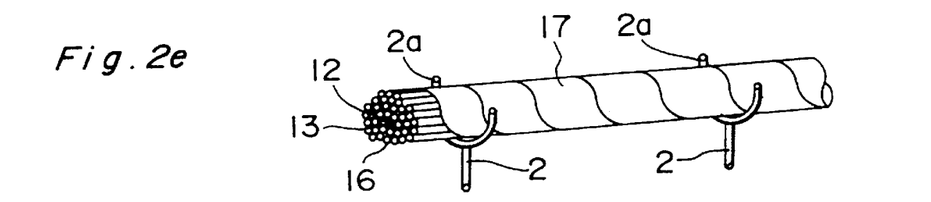

As shown in FIG. 2e, an adhesive tape 17 is then wrapped around the outside circumference of the other wires 16 to bundle all of the wires together with the specific wires 12 and 13 positioned at the middle of the bundle and surrounded by other wires 16 held in position by the double-sided adhesive tape 14.

Figure 2F:
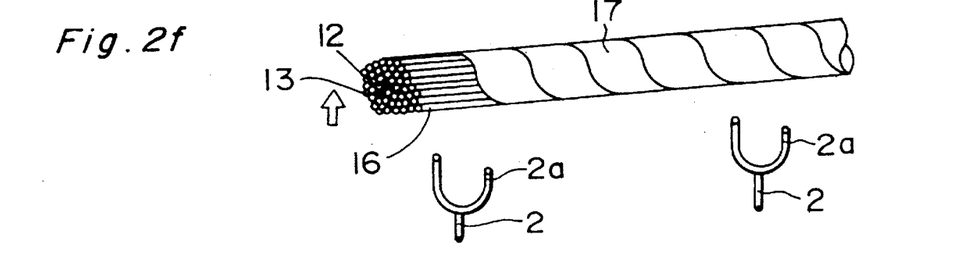

As shown in FIG. 2f, the bound wire harness 10 is then removed from the bundling stands 2.

It is to be noted that even when there is only one specific wire, it is necessary to wrap double-sided adhesive tape 14 around the outside circumference of the wire. Note also that when there are two or more plural specific wires as described above, wrapping the double-sided adhesive tape 14 also functions to bundle the plural specific wires together.

A second embodiment of a bundling method according to the present invention is described below with reference to FIGS. 3a–3e. Note that the wire holders 2a' of the bundling stands 2' in this embodiment feature a wide U-shaped configuration.

Figure 3A:
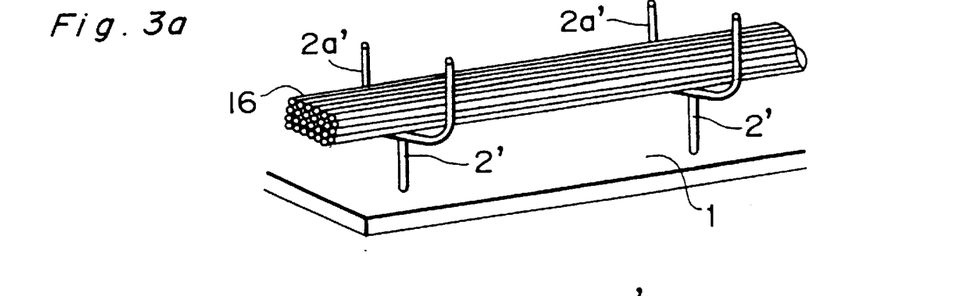
FIGS. 3a–3e are perspective views showing the steps according to the second embodiment for making a wire harness of the present invention.

As in the bundling method of the first embodiment described above, the first step is to place all of the wires 16 other than the specific wires 12 and 13 in the U-shaped wire holders 2a' of the bundling stands 2' as shown in FIG. 3a.

Figure 3B:
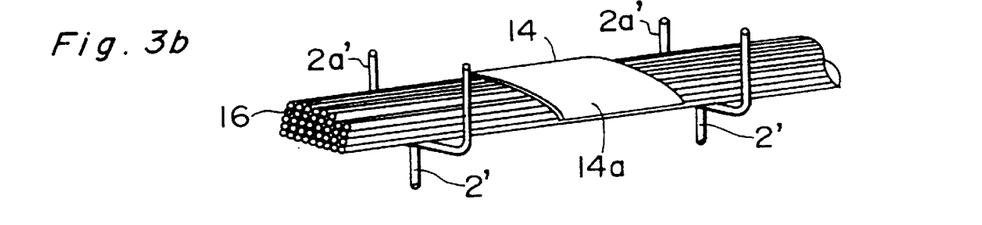

As shown in FIG. 3b, a sheet of double-sided adhesive tape 14 is then placed on top of the other wires 16 with the bottom surface 14b thereof adhering to the tops of the top wires 16.

Figure 3C:
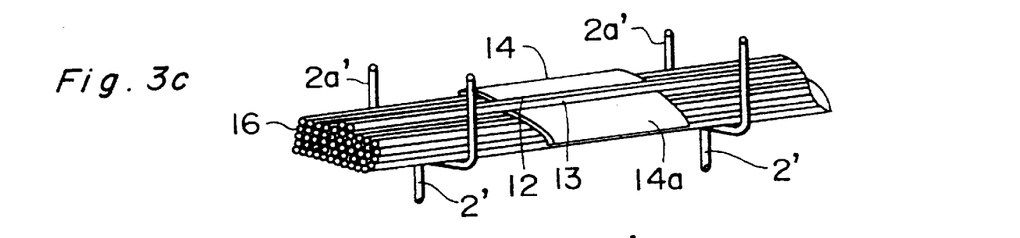

As shown in FIG. 3c, the specific wires 12 and 13 are then placed in the wire holders 2a' of the bundling stands 2' with the specific wires 12 and 13 adhering to the center of the top surface 14a of the double-sided adhesive tape 14.

Note that the specific wires 12 and 13 are preferably pre-bundled with tape to prevent dispersed, random positioning to the top of the double-sided adhesive tape 14. Note also that bundling the specific wires 12 and 13 with double-sided adhesive tape can assure more positive adhesion of the specific wires 12 and 13 to the double-sided adhesive tape.

Figure 3D:
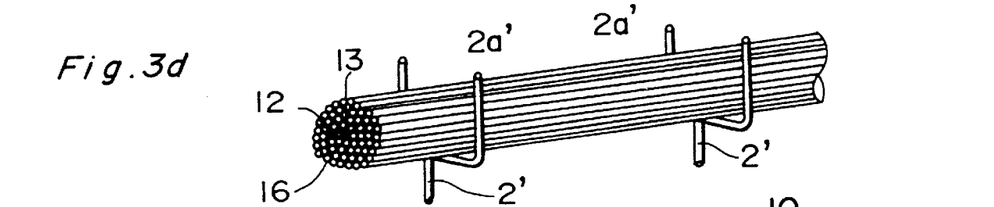

As shown in FIG. 3d, the wire bundle is then rolled up such that the entire length of the specific wires 12 and 13 is wrapped inside the double-sided adhesive tape 14.

Because other wires 16 adhere to the entire bottom side of the double-sided adhesive tape 14, when the double-sided adhesive tape 14 is wrapped around the outside circumference of the specific wires 12 and 13, the specific wires 12 and 13 become surrounded by other wires 16 through the double-sided adhesive tape 14, i.e., the specific wires 12 and 13 are now positioned at the cross sectional center of the wire group.

Figure 3E:
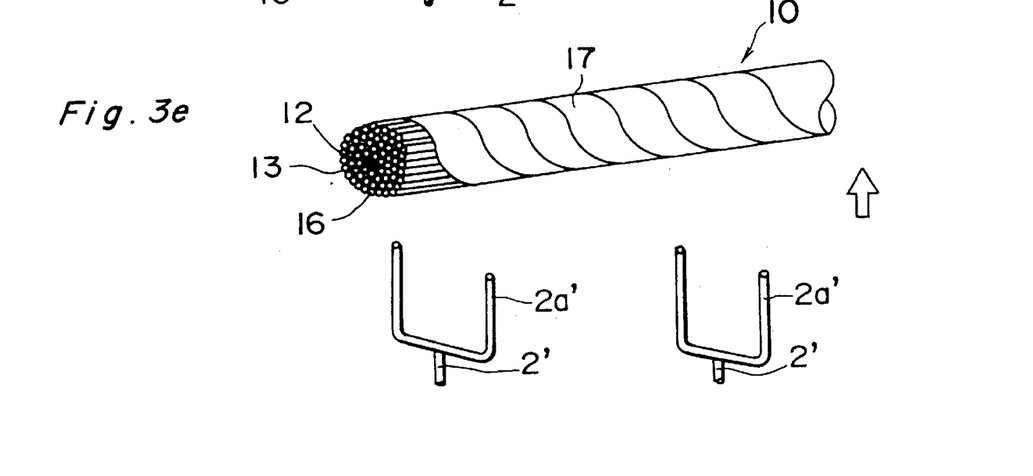

As shown in FIG. 3e, adhesive tape 17 is then wrapped around the outside circumference of the other wires 16 as in the first embodiment above, and the bound wire harness 10 is then removed from the bundling stands 2' as shown in FIG. 3e.

Figure 4:
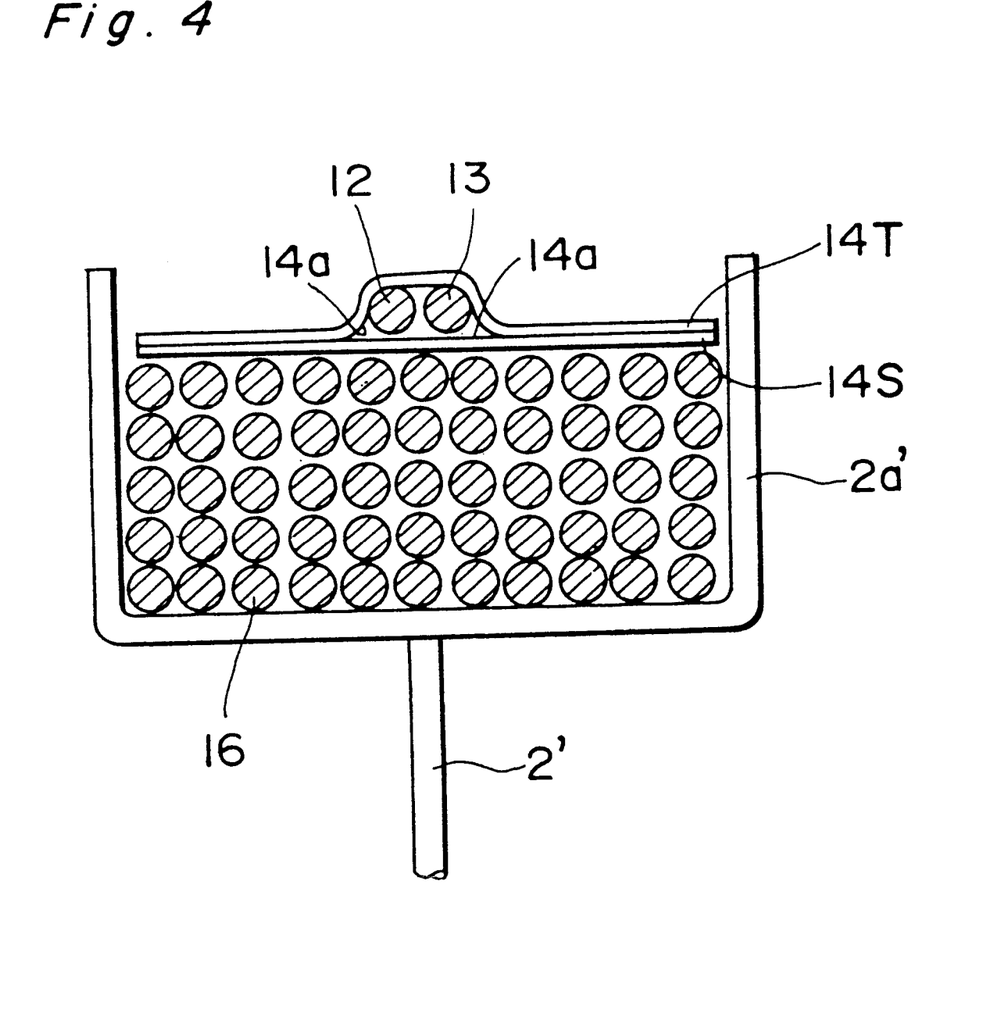
FIG. 4 is a cross-sectional view showing a third embodiment of a bundling method for a wire harness of the present invention.

Referring to FIG. 4, a third embodiment of a bundling method according to the present invention is shown. This is a variation of the second embodiment above, specifically in the placement of double-sided adhesive tape 14S and 14T on both sides, top and bottom, of the specific wires 12 and 13. Specifically, after placing the other wires 16 in the wire holders 2a' of the bundling stands 2', the first layer of double-sided adhesive tape 14S is placed on the top other wires 16, the specific wires 12 and 13 are placed on top of the first layer of double-sided adhesive tape 14S, and the second layer of double-sided adhesive tape 14T is then placed over the specific wires 12 and 13. As a result, the entire outside circumference, including top and bottom surfaces, of the specific wires 12 and 13 adheres to and is enveloped by the two layers of double-sided adhesive tape 14S and 14T.

After this step, the third embodiment is identical to the second embodiment described above. Note that additional other wires 16 may be placed over the top side of the top layer of double-sided adhesive tape 14T such that the specific wires 12 and 13 are surrounded by the other wires 16 adhering to the double-sided adhesive tapes 14S and 14T, and the specific wires 12 and 13 are firmly held between the double-sided adhesive tapes 14S and 14T.

While double-sided adhesive tape is used in each of the embodiments above, it is sufficient if there is an adhesive area on both sides of the tape. Butyl tape can therefore be suitably applied, and is preferable because of its elasticity.

According to the above preferred embodiments, the selected core wires can be positioned separately from the other wires at the cross sectional center of a wire harness by using double-sided adhesive tape, butyl tape, or another tape with adhesive areas on both sides thereof with the selected core wires adhering to one side of the tape and wires other than these selected core wires adhering to the other side of the tape.

Compared with conventional bundling methods, the bundling method of the present invention for positioning selected core wires at the cross sectional center of a wire harness can be achieved simply and without increasing manufacturing costs because adhesive tape or butyl tape is simply wrapped around the selected core wires or is applied to the top of the wires other than the selected core wires.

Figure 5A:
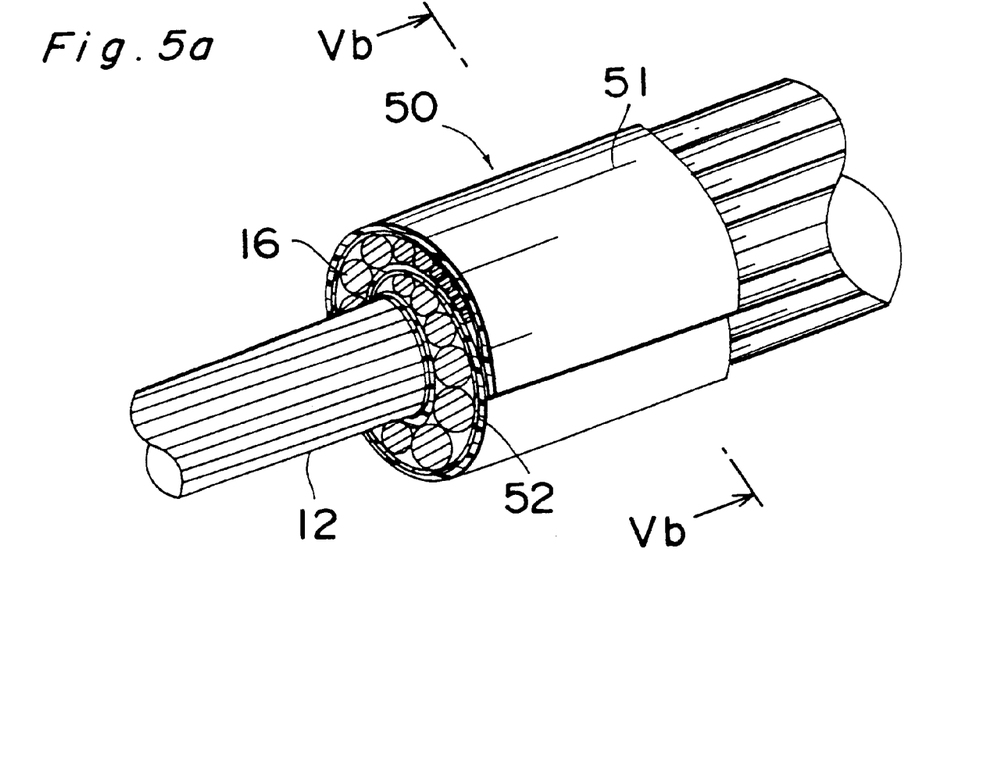
FIG. 5a is a perspective view showing a wire harness using a single binding sheet according to a fourth embodiment of the present invention.
Figure 5B:
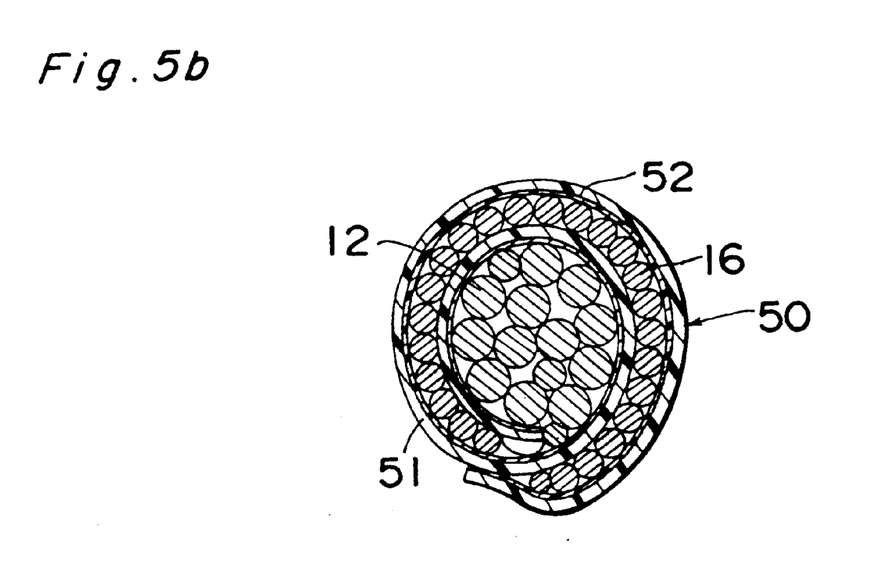
FIG. 5b is a cross-sectional view taken along a line Vb—Vb shown in FIG. 5a, FIGS. 6a–6c are diagrammatic views showing wire harness bundling method of the fourth embodiment.

Referring to FIGS. 5a and 5b, a wire harness 50 according to the fourth embodiment is shown. The wire harness 50 comprises specific wires 12, common wires 16, and a binding sheet 51. The specific wires 12 are positioned at the cross sectional center of the wire harness 50, and the sheet 51 and common wires 16, which are fixed to the sheet 51 with no gaps between the wires, are coiled around the specific wires 12. Specifically, the outside of the specific wires 12 is covered with alternating layers of the sheet 51 and common wires 16, and these layers effectively protect the specific wires 12.

The sheet 51 is preferably a polyethylene or polyvinyl chloride (PVC) sheet 0.01–0.03 mm or 0.3–0.7 mm thick, respectively. The sheet 51 is pliable.

It is to be noted that while thin polyethylene sheets are relatively difficult to roll, the thinness of the sheet does not significantly increase the wire harness diameter, and can effectively fill any gaps that may develop between the wires. While a PVC sheet does increase the wire harness diameter, it can be more easily rolled and provides greater protection for the specific wires. As a result, the type of material used for the sheet can be appropriately selected according to the type of wire harness being made.

The sheet 51 is rectangularly shaped with an adhesive 52 coating applied over all of one side which faces the wires.

The common wires 16 are arranged side by side with no gaps therebetween on the sheet 51, and fastened to the sheet 51 by the adhesive 52. In principle, the common wires 16 are attached to the sheet 51 in a single layer. Note, however, that when the wire diameter is small, the common wires 16 may be arranged on the sheet 51 two deep with only part of the common wires 16 held directly by the adhesive 52.

Figure 6A:
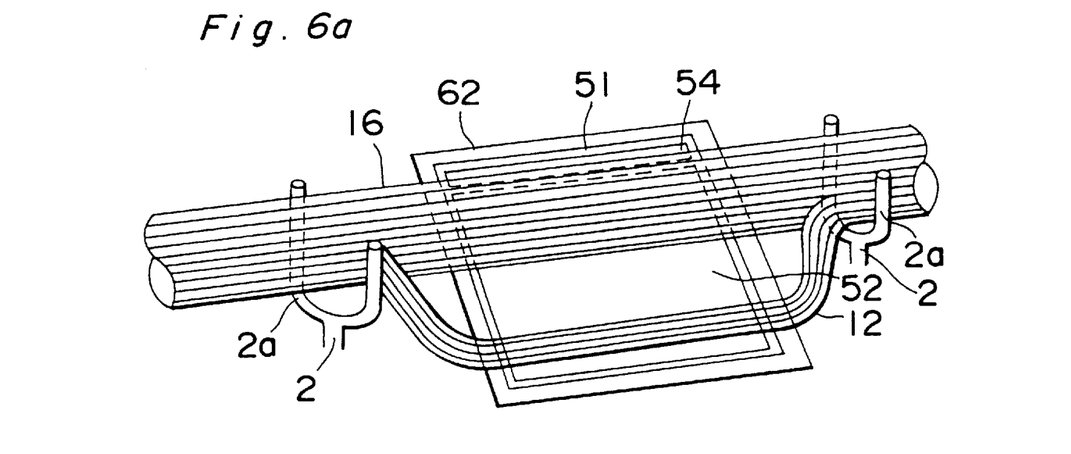

A peel-off paper 54 is also provided along the one edge of the sheet 51 as shown in FIG. 6a. This peel-off paper 54 is removed in the completed wire bundle shown in FIG. 5a, and is used to ensure positive adhesion between the adhesive 52 at the closing edge and the back of the sheet 51 so that the wire bundle remains coiled.

The method of bundling a wire harness as shown in FIGS. 5a and 5b is described with reference to FIGS. 6a–6c below.

As shown in FIG. 6a, the first step is to place the specific wires 12 and common wires 16 at random in the wire holders 2a of the bundling stands 2, which project from the wire harness assembly stand, from the top opening.

The specific wires 12 are then separated from the randomly placed wire bunch held at two places by the bundling stands 2, and are pulled together to one side (forward in FIG. 6a) between the bundling stands 2.

Note that the specific wires 12 and common wires 16 can be quickly and easily separated in this bundling process by pre-bundling the specific wires continuously or in part using tape or another binding means before placement in the wire holders 2a.

The sheet 51 is placed between the bundling stands 2 on a sheet table 62, which is provided below the wire wrapping position, with the adhesive 52 side up and the edge without the peel-off paper 54 to the side to which the specific wires 12 are pulled.

The specific wires 12 are arranged with no gaps therebetween on top of the sheet 51, pressed into the sheet 51, and thus secured by the adhesive 52 to the sheet 51.

Figure 6B:
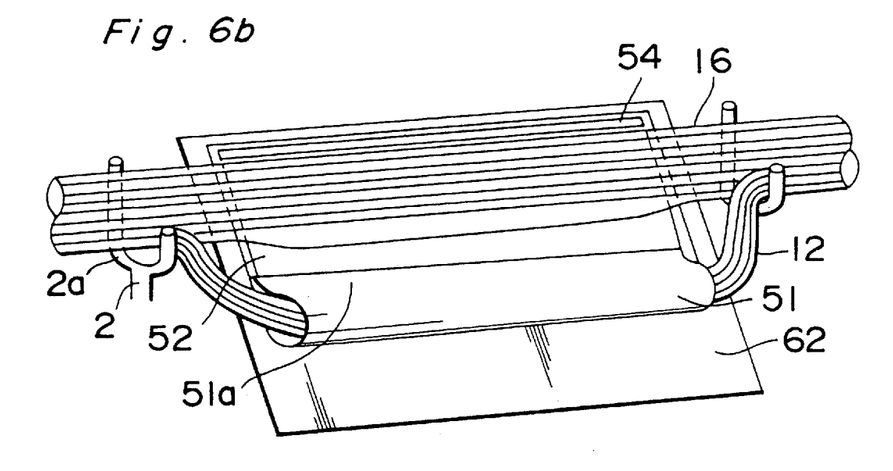

As shown in FIG. 6b, the sheet 51 is then wrapped from the one edge 51a to envelope the specific wires 12, and this one edge 51a is pressed against the adhesive 52 to bond the two sheet members together. At this time, the specific wires 12 are completely enclosed in a cylinder formed by the wrapped sheet 51, and are thus positively positioned to the sheet 51.

All of the common wires 16 are then arranged with no gaps in between on the remaining top area of the sheet 51, and are similarly held by the adhesive 52 to the sheet 51. Note that a single layer, side-by-side arrangement is preferred because overlapping of the common wires 16 may result in some wires not being held by the adhesive 52. If the wire diameter is small, however, the wires may overlap with only part of the total number of wires held by the adhesive 52.

Figure 6C:
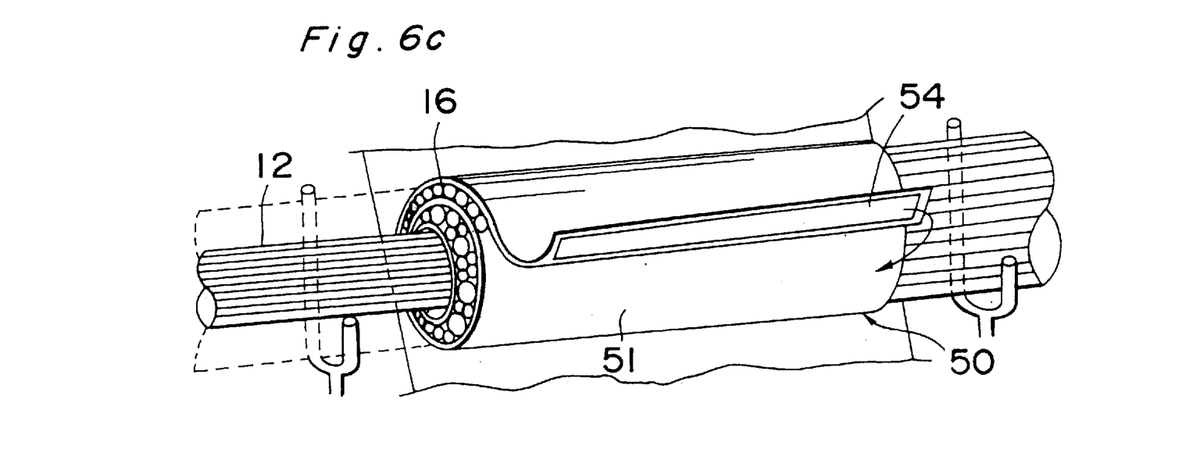

As shown in FIG. 6c, the remaining sheet 51 on which the common wires 16 are arranged is then wrapped in a coil with the adhesive side of the sheet 51 to the inside and the bundle of specific wires 12 previously wrapped in the sheet 51 at the center. Sufficient pressure is applied while wrapping to press the specific wires 12 tightly to the sheet 51 at the inside of the bundle, and thus prevent gaps from developing.

When the sheet 51 is completely wrapped, the peel-off paper 54 is removed and the sheet edge is bonded by the adhesive 52 to the outside of the coiled sheet, thereby keeping the sheet 51 coiled.

By means of the bundling method of the invention thus described, power supply wires or other specific wires can be positively positioned at the cross sectional center of a wire harness with the outside of these specific wires covered by layers of common wires and binding sheet. The wire harness bundling structure of the invention therefore reliably protects the specific wires: any external member interfering with the wire harness must first penetrate one or more layers of binding sheet and common wires before directly affecting the specific wires at the core, and the specific wires are thus protected. Potential damage to the specific wires can also be more easily identified before actual damage occurs because the common wires will be damaged or shorted first.

The specific wires can also be reliably positioned at the cross sectional center of the wire harness without intermixing with the common wires because the sheet is first wrapped completely around the specific wires and bonded to itself, thus forming a cylinder sealing the specific wires inside.

The bundling task can also be completely very easily and efficiently by means of the invention because the wires are simply arranged on the sheet and the sheet is then rolled up.

The invention can also be applied to wire harnesses of different diameters even when the diameter of the specific wire core changes with the diameter and number of specific wires because the wires are simply rolled inside a sheet, and is similarly compatible with a variable number of common wires because the common wires are also simply wrapped inside the sheet.

Commonly available sheet materials can also be used as the sheet having an adhesive coating on one side, and no special bundling tools are required. As a result, the invention offers the further benefit of having a low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wire harness bundling method for making a wire harness of plural electrical wires bundled together by a binding material such that at least one specific wire is positioned at a cross sectional center of the bundle of wires, said method comprising the steps of:

(a) placing wires other than said specific wires in a wire holder projecting from a wire harness assembly stand;

(b) wrapping said specific wire with a first binding means having opposite surfaces with adhesive characteristics for binding said specific wire;

(c) placing the wrapped specific wire in said wire holder on top of the other wires so that the outside surface of said first binding means is attached to wires other than said specific wire;

(d) moving other wires not attached to said first binding means to top and sides of said specific wire to envelope said specific wire on all sides; and (e) applying a second binding means for binding said electrical wires with said bound specific wire positioned at a cross sectional center of the bundle of wires.

2. A wire harness bundling method according to claim 1, wherein said first binding means is a double-sided adhesive sheet.

3. A wire harness bundling method according to claim 1, wherein said first binding means is a butyl sheet.

4. A wire harness bundling method according to claim 1, wherein said specific wire is live power supply lines.

5. A wire harness bundling method according to claim 1, wherein said specific wire is wires for audio speakers.

6. A wire harness bundling method for making a wire harness of plural electrical wires bundled together by a binding material such that at least one specific wire is positioned at a cross sectional center of the bundle of wires, said method comprising the steps of:

(a) placing wires other than said specific wires in a wire holder projecting from a wire harness assembly stand;

(b) applying a first binding means having opposite surfaces with adhesive characteristics on top of said other wires so that the bottom surface of said first binding means is attached to said other wires;

(c) placing said specific wire on top of said first binding means;

(d) wrapping said specific wire by said first binding means and, moving other wires not attached to said first binding means to top and sides of said specific wire to envelope said specific wire on all sides; and (e) applying a second binding means for binding said electrical wires with said bound specific wire positioned at a cross sectional center of the bundle of wires.

7. A wire harness bundling method according to claim 6, further comprising after said step (c), step of (f) applying an auxiliary binding means having opposite surfaces with adhesive characteristics over said first binding means, and wherein in said step (d) said specific wire is wrapped by said first binding means and said auxiliary binding means.

8. A wire harness bundling method according to claim 6, wherein said first binding means is a double-sided adhesive sheet.

9. A wire harness bundling method according to claim 6, wherein said first binding means is a butyl sheet.

10. A wire harness bundling method according to claim 6, wherein said specific wire is live power supply lines.

11. A wire harness bundling method according to claim 6, wherein said specific wire is wires for audio speakers.

12. A wire harness bundling method for making a wire harness of plural electrical wires bundled together by a binding material such that at least one specific wire is positioned at a cross sectional center of the bundle of wires, said method comprising the steps of:

(a) placing wires including said specific wires in a wire holder projecting from a wire harness assembly stand;

(b) wrapping said specific wire with one end portion of a binding sheet having opposite surfaces with adhesive characteristics for binding said specific wire;

(c) rolling said binding sheet with wires other than said specific wires captured in a space between inside rolled binding sheet and outside rolled binding sheet to place said bound specific wire at a cross sectional center of the bundle of wires; and (d) firmly attaching an end edge of said binding sheet to the rolled binding sheet.

13. A wire harness bundling method according to claim 12, wherein said binding sheet has the adhesive characteristics on one surface facing said specific wire.

14. A wire harness bundling method according to claim 12, wherein said specific wire is live power supply lines.

15. A wire harness bundling method according to claim 12, wherein said specific wire is wires for audio speakers.

* * * * *

UNITED STATES PATENT AND TRADEMARK OFFICE
CERTIFICATE OF CORRECTION

PATENT NO. : 5,940,962
DATED : August 24, 1999
INVENTOR(S) : N. Shima, et. al.

It is certified that error appears in the above-identified patent and that said Letters Patent is hereby corrected as shown below:

Title page, item [56], References Cited, the following U.S. Patent Document was omitted and should be inserted: 5,338,014   8/1994   Kitamura Signed and Sealed this Fifth Day of December, 2000

Attest:

Q. TODD DICKINSON

*Attesting Officer*     *Director of Patents and Trademarks*